United States Patent
Fier

[11] 3,904,220
[45] Sept. 9, 1975

[54] COMPACT HIGH STRENGTH AUXILIARY LIFT AXLE SUSPENSION SYSTEM

[75] Inventor: Raymond L. Fier, Massillon, Ohio

[73] Assignee: TWM Manufacturing Company, Inc., Canton, Ohio

[22] Filed: June 3, 1974

[21] Appl. No.: 476,009

[52] U.S. Cl. .................. 280/124 F; 180/24.02
[51] Int. Cl.² .................................. B60G 11/48
[58] Field of Search ... 180/24.02; 280/124 R, 124 F

[56] References Cited
UNITED STATES PATENTS

| | | | |
|---|---|---|---|
| 3,045,998 | 7/1962 | Hirst | 280/124 F |
| 3,104,622 | 9/1963 | Van Zijp | 280/124 X |
| 3,578,355 | 5/1971 | Oeder | 280/124 |
| 3,617,072 | 11/1971 | Turner | 180/24.02 |

*Primary Examiner*—Philip Goodman
*Attorney, Agent, or Firm*—Hall & Myers

[57] ABSTRACT

Provided is a compact, high strength auxiliary lift axle suspension system comprised of a relatively short frame rail means, an upwardly biased leaf spring which normally holds the wheels out of engagement with the road surface, a pair of air bags, one located fore and one aft, respectively, of the axle retained by an intermediate portion of the upwardly biased leaf spring, which airbags when inflated will drive the wheels into engagement with the road surface against the upward bias of the leaf spring, and angle bracket means for connecting the top plates of the air bags, at a finite angle to the horizontal, to, on one instance, the spring hanger brackets extending downwardly from the frame rail means and, in another instance, via web means to the frame rail of the suspension. By canting the air bags at an angle to the horizontal, space is saved for a more compact unit. By employing in combination therewith, the described angle bracket which deepens the beam, high strength with space saving smaller widths in the hanger brackets is achieved. By adjusting the relative angles between the top and bottom plates of the air bags, shear on the air bags during use is minimized, while obtaining high strength and at the same time, saving space.

9 Claims, 3 Drawing Figures

COMPACT HIGH STRENGTH AUXILIARY LIFT AXLE SUSPENSION SYSTEM

This application relates to auxiliary axle suspension systems for wheeled vehicles. More specifically, this application relates to lift axle suspension systems, particularly useful in small spaces wherein high strength is still required.

U.S. Pat. No. 3,285,621 sets forth a unique concept in the auxiliary lift axle suspension system industry. In that patent, there is disclosed the unique and highly advantageous feature of employing in combination, an upwardly biased leaf spring which normally holds the wheel of an auxiliary axle out of engagement with the road surface, and an air bag system which, when inflated, drives the axle downwardly against the upward bias of the leaf spring, thus lowering the wheels into engagement with the road surface. The wheels may be automatically returned to their "up" or non-road-engaging position by releasing the air from the air bag system thereby lifting the wheels automatically because of the upward bias of the leaf spring.

U.S. Pat. No. 3,877,718 discloses a unique improvement upon the above-described basic concept of U.S. Pat. No. 3,285,621. Therein a system of exceptional strength is disclosed. The system generally comprises an air bag system (usually of four bags, e.g. Firestone Airides No. 22 reported in Firestone's 1965 catalog as having an approximate effective area at mid-design position of 72 sq. in., a stroke of 9 inches and an outside diameter at 100 psi full compression of 12.9 inches --;) offset from the vertical plane of the axial, in combination with an upwardly biased leaf spring so as to achieve the unique advantages of the concept of the aforesaid U.S. Pat. No. 3,285,621. High strength is then uniquely achieved by a technique which locates the air bags in a "spread configuration" and which locates the leaf spring substantially directly under the frame member. The entire disclosure of U.S. Pat. No. 3,887,718, and the basic U.S. Pat. No. (3,285,621) is incorporated herein by reference.

While the above-developed concepts are extremely important to the art, achievement of substantial strengths usually require the use of relatively long frame rails, relatively wide hanger brackets, and/or relatively large air bags. The length, therefore, of such a suspension system (in the longitudinal direction of the frame member of the vehicle) is often substantial, thus not lending itself to be placed in relatively small spaces, when necessary, on the frame of the vehicle. In addition, the length of such systems causes the primary axle to be spaced a considerable distance from the auxiliary axle, thus increasing the steering effort.

It is, therefore, apparent that there is a need in the art for an auxiliary axle suspension system which can embody the above-described uniqueness of the invention disclosed in the aforementioned patents, but which also is a more compact unit, useful in shorter or smaller spaces on a truck or other wheeled vehicle body and/or for reducing the spacing between the primary and auxiliary axles thus to decrease the steering effort.

This invention fulfills this and other needs in the art which will become more apparent to the skilled artisan once given the following disclosure. Generally speaking this invention fulfills this and other needs in the art by providing a unique system which cants or tilts the air bags located fore and aft of the axle, so as to achieve a more compact unit. In addition, the canting is done in such a way as to still retain the strengthening features of the above-described devices so as to achieve high strength in the unit. In further embodiments, relative canting between the top and bottom of the air bag is adjusted so as to minimize shear in the air bags while still maintaining the high strength nature of the device.

There are indications in the prior art, that it has heretofore been known to cant or angle one of the plates of an air bag system in order, for example, to get a better alignment of the bumpers of the air bag. Such bevelling, however, does not necessarily reduce shear, and of course without proper angling or canting does not conserve space while retaining strength.

Thus, generically speaking, the subject invention comprises an auxiliary axle suspension system for a wheeled vehicle having an axle and at least one longitudinally extending frame member, the system comprising a frame rail for connecting the system to the vehicle frame member, at least one leaf spring, at least one vertically flexible pneumatic chamber, spring hanger means connected to said frame rail for retaining the leaf spring at its ends, means for retaining the leaf spring at a point intermediate its ends in a normally upwardly biased configuration, and means for locating the pneumatic chamber within the system such that when pneumatic pressure is applied to the chamber, it expands, forcing the axle downwardly against the normal upward bias of the leaf spring, the system being characterized by the pneumatic chamber being canted or tilted at a finite angle in a longitudinally space saving configuration. In certain preferred embodiments the system is further characterized by the means for taking up the horizontal force components of braking and dynamic operating forces (e.g. the springs or radius rod) being located substantially directly under the longitudinally extending frame member when the system is installed, and/or the pneumatic chamber being located in a spread configuration.

In further preferred embodiments of this invention, there are employed two pairs of air bags, one of each pair fore and aft of the axle and wherein the upper plate of the air bags are held at a finite angle to the horizontal by an angled flange which is connected at one leg of the angle to the upper plate of the air bags, and to an opposing hanger bracket by another leg of said angle, and wherein there is provided a web means for connecting the upper plate connecting leg to the frame rail of the suspension. In further preferred embodiments, the upper plate of the air bags is angled relative to the lower plate of the air bags so as to minimize the shear stresses on the air bags when in use.

The invention will now be described with reference to certain embodiments thereof, taken in combination with the accompanying illustrations, wherein:

IN THE DRAWINGS

Figure 1:
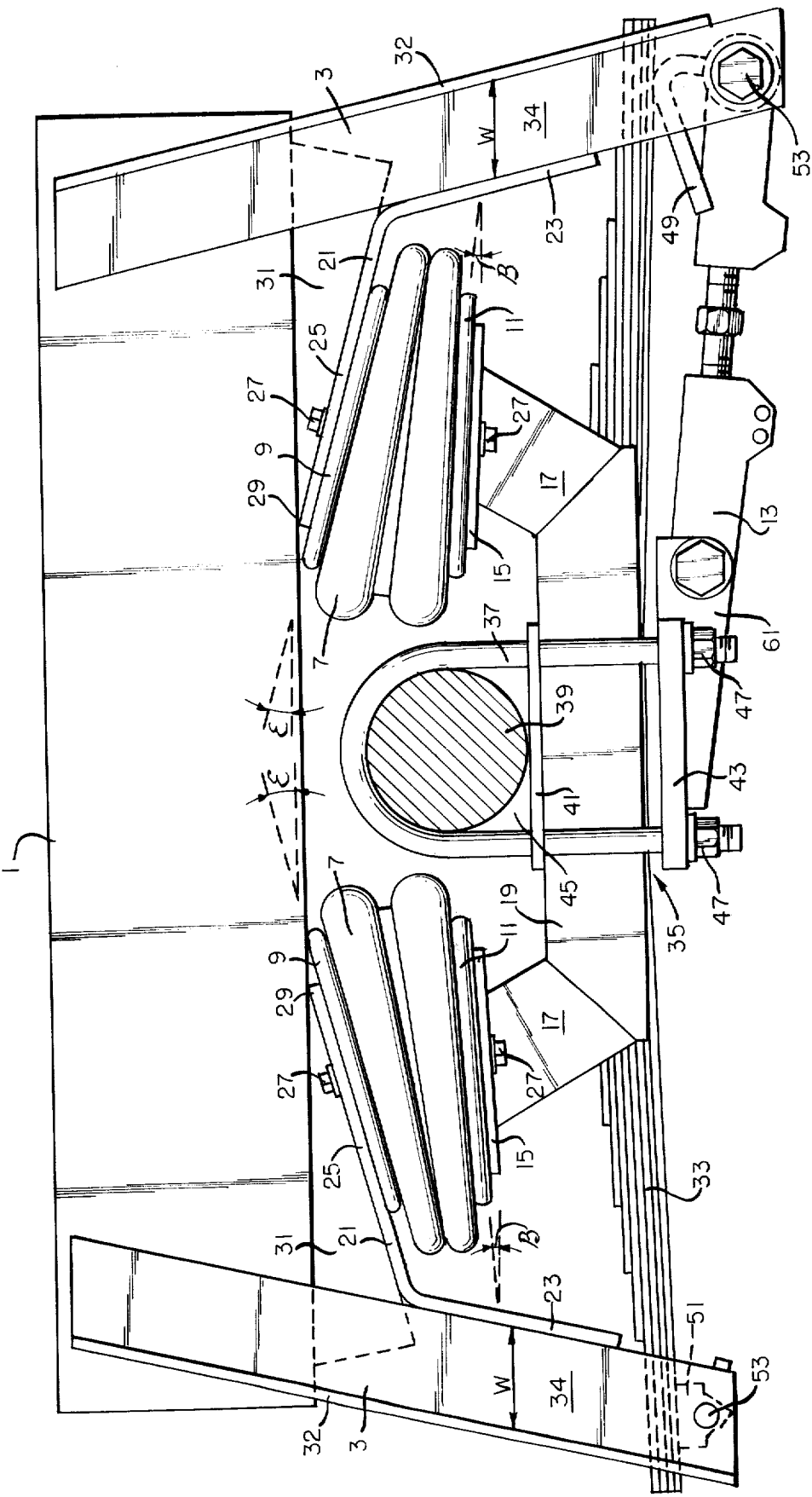
FIG. 1 is a side plan, partially sectionalized view of an embodiment of this invention.
Figure 2:
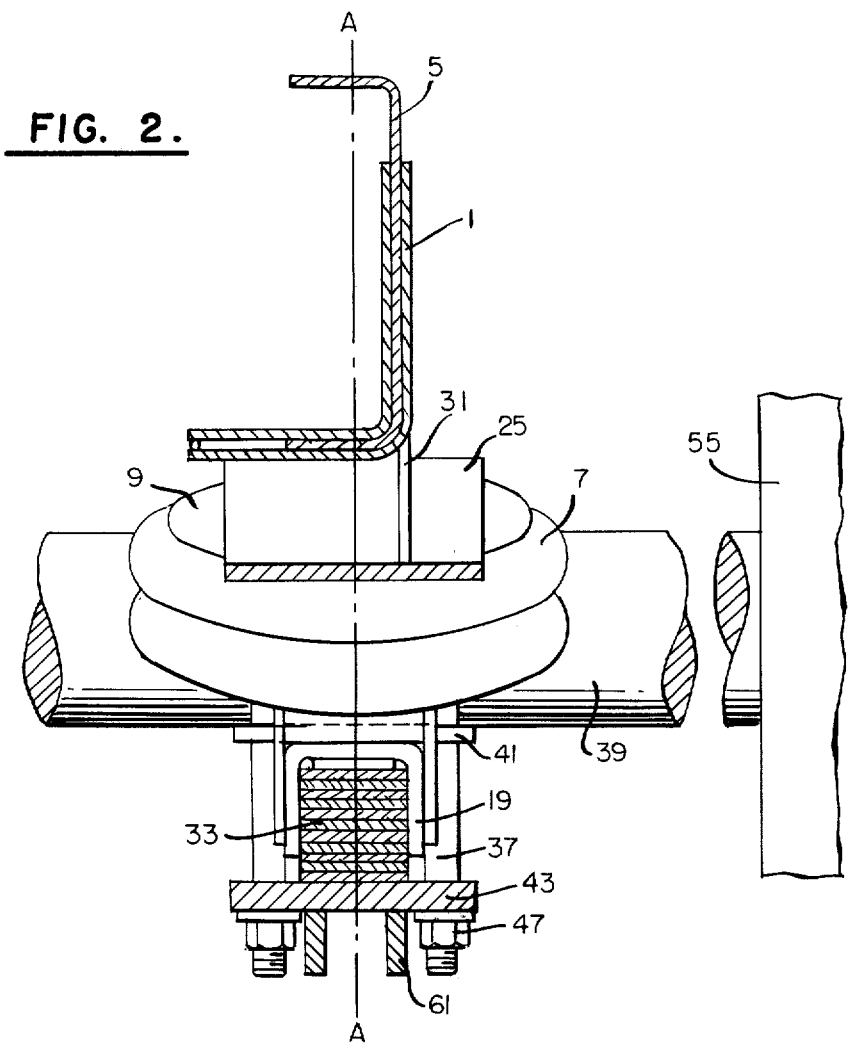
FIG. 2 is an end, partially sectionalized view of the embodiment of FIG. 1.

The embodiment of this invention illustrated in FIGS. 1–2, includes a frame rail 1 and downwardly extending hanger brackets 3 connected thereto. The side view illustrated in FIG. 1 is duplicated on the other side of the vehicle such that in the overall composite embodiment there are two frame rails 1 located on either side and positioned against the longitudinally extending frame member 5 (see FIG. 2) of the vehicle.

As will be more fully explained hereinafter, one of the points of uniqueness of this invention is the ability to employ a system of more compact or shorter length than has heretofore been employed while still maintaining high strength in the unit. The significant advantage of this, of course, is that the unit is then capable of being placed in smaller vacant spaces on the wheeled vehicle upon which it is to be employed. For example, upwardly biased leaf spring lift system devices heretofore known, such as those exemplified by U.S. Pat. No. 3,877,718 and the "1400 Series" produced by Dura Corporation, which employ two pairs of air bags (e.g. Firestone Airides No. 22), usually are of more than approximately 50 inches in overall length and are usually as much as about 55 inches or more in overall length. Such is a limiting factor upon their use since there are a number of instances which would lend themselves to the use of such devices if their overall length could be reduced to less than about 50 inches. While the overall length is often of prime consideration, there are other instances in which the overall length is of less importance than the length of the frame rail itself. For example, there is a definite need to obtain units whose frame rails do not exceed about 40 inches in length which heretofore is about 8 inches less than accomplished in the practice of U.S. Pat. No. 3,877,718. In addition, spacing between the primary axle and auxiliary axle is usually about 54 inches or more in the practice of the aforesaid copending application. A reduction of even 1 inch, but preferably to about 50 – 51 inches or less, would significantly reduce the steering effort.

The embodiments of the subject invention and particularly the units as illustrated in the drawings, may usually be manufactured with significantly high strength from conventional materials, and still maintain an overall length of significantly less than about 50 inches and/or with frame rails of less than about 40 inches in length and/or axle spacings of considerably less than 54 inches. In fact, high strengths and total reliability are achievable with overall lengths of 47 inches or less, frame rails of about 39 ½ inches or less, and axle spacings (between primary and lift axle) of about 50 – 51 inches or less. This represents a particularly significant advance in the heavy trucking industry since there are a significant number of heavy duty trucks and tractors which benefit significantly from reduced steering effort and/or which do not have room for units greater than about 50 inches in length (especially in the tag position) but which can accommodate the shorter, more compact length of the embodiments of this invention.

As stated hereinabove, in order to achieve this compactness and yet achieve acceptable strength in the unit, the air bags 7 (of conventional design, either in convoluted or rolling lobe form) are canted or angled at a finite angle to the horizontal. This canting can be achieved by angling both top plate 9 and bottom plate 11 so as to tilt the entire air bag. On the other hand, and in many instances due primarily to the downwardly diverging nature of brackets 3, sufficient space is conserved merely by canting the top plate 9 while allowing the bottom plate 11 to remain substantially horizontal. In either instance the bags are considered as being "canted" or "tilted" for the purposes of this invention. The specific angles employed are dictated by the amount of compactness wished to be achieved.

While canting bags 7 conserves space it also sets up shear forces in the bags during use. Therefore, in the preferred embodiments of this invention, shear is minimized (i.e., reduced) by canting or angling the top plates 9 or air bag 7 a finite amount in regard to their respective bottom plates 11. In doing this, the angle of the air bags to the horizontal is coordinated with the angle between the air bags, as more fully explained hereinafter, so as to reduce the shear stress on the bags during operation while at the same time obtaining the necessary "compactness" and achieving the required strength.

In FIG. 1, the finite angle of the tilt of the upper plates 9 of the bags to the horizontal has been indicated as angle $\epsilon$ in the dotted lines to the right and left, respectively, of the plates 9. The angle, if any, given to the lower plates 11 of the air bags 7 has been illustrated as angle $\beta$.

The bottom plates 11 are conveniently tilted to the desired angle $\beta$ by the appropriate manufacture of platforms 15 located at the extremities of upwardly extending arms 17 of load arm 19. While it may often be most desirable, for best reduction of stress on the air bags, to have angle $\beta$ of base plate 11 located above radius rod 13 at a different angle from its corresponding angle of the other base plate 11, such would present something of a manufacturing and installation difficulty in that the difference between the two angles $\beta$ would often be so small that it would be difficult to tell in a mass manufacturing operation without special marking and the like on the load arm, which side of the load arm goes with or opposite to radius rod 13. For this reason, a compromise is often made so that both angles $\beta$ are the same and an average between the two. With the high quality air bags now available such a compromise has been found to be entirely satisfactory.

One of the unique features of this invention is the manner in which upper plate 9 of air bag 7 is canted and connected to the rest of the system so as to achieve air bag tilt and at the same time reduce the width W of brackets 3 while still maintaining high strength. This is accomplished by the use of angle brackets 21 which include a downwardly extending leg 23, connecting plate 25 and a web 31 extending between plate 25 and rail 1. Plate 25 may be connected to top plate 9 of air bag 7 by any conventional means such as bolt 27 or the like. In a similar manner, platforms 15 may be connected to bottom plates 11 via bolt means 27. Web 31 is preferably a triangular plate means welded to the top surface of plate 25 and located so as to form a "beam" with rail 1.

Angle brackets 21 serve several important functions. For example, they serve as the upper plate against which the air bags push as they expand to lower the wheel into engagement with the road surface. Further, by allowing the end 29 of top leg 25 to reside against (usually welded to) the lower surface of frame rail 1 and with the presence of web 31 and leg 23 located far down on bracket 3, a deep beam is formed. The use of this "deep beam" significantly strengthens the system while allowing the longitudinal wall 34 of bracket 3 to be of a shorter width W than would normally have to be employed — thus reducing the overall length of the system. This beam is further strengthened by a front lateral plate 32 located on brackets 3 and perpendicular to plate 34. Still further, by providing the requisite angle between legs 23 and 25, the necessary cant or tilt to the air bags is adopted and space is conserved.

Substantially all of the remaining portions of the unit illustrated in FIG. 1 are disclosed in U.S. Pat. No. 3,877,718. By the employment of the unique load arm 19, upwardly biased multileaved leaf spring 33 may be located substantially directly under the frame member of the vehicle as best illustrated in FIG. 2 and hereinafter more fully described. Also provided is a retaining mechanism generally illustrated at 35. Retaining mechanism 35 is comprised of a pair of U-bolts 37. U-bolts 37 overlap axle 39 at their U end. Upper retaining plate 41 and lower retaining plate 43 secure the load arm 19 and spring 33 to the axle 39. A contour conforming block 45 may be placed between retaining plate 41 and axle 39 so as to conform the circular surface of axle (which may be solid or hollow and of conventional design) to the surface of retaining plate 41. At the ends of U-bolts 37 there are provided lug or nut means 47 for tightly securing the unit in its proper position of alignment.

There is, in accordance with the teachings of U.S. Pat. No. 3,877,718, preferably, but optionally, employed in the operation of this device, radius rod 13. Radius rod 13 is of conventional design and generally has provided thereon a sliding mechanism 49 for allowing the free end of spring 33 to slide and yet be retained thereon during operation of the device. In a similar fashion, there is a rotating and sliding block 51 provided at the other end of spring 33 so as to allow a similar operation of the end of that spring to take place during operation of the unit. The radius rod and the slider block 51 are retained in their respective hanger brackets 3 by pins 53. As can be seen, hanger bracket 3 which retains the radius rod is longer than hanger bracket 3 opposite to the radius rod.

Referring now to FIG. 2, the alignment, for high strength purposes, is illustrated therein. As can be seen, the center line of the spring and radius rod bracket 61 (represented as line A—A) is located substantially directly under frame member 5 of the vehicle when installed. As disclosed in U.S. Pat. No. 3,877,718, this achieves high strength. In this respect, by eliminating the need to place spring 33 outboard of the frame member of the vehicle, the air bags are able to be moved out in a "spread configuration". This is illustrated in FIG. 2 since A—A is also the center line of the air bags.

The term "substantially directly under" as it is used in this application, is used in the same way that it is employed in U.S. Pat. No. 3,877,718 and as it applies to the location of the means for taking up the horizontal force components (the radius rod when one is employed or the leaf springs when a radius rod is not employed). The term is used herein to means that such means are so located as to effectively translate, in a substantially noneccentric way, the force components into the load bearing members of the vehicle designed to handle such forces, i.e., the frame members. In those preferred instances where such means are comprised of the leaf spring or radius rod, such substantially noneccentric translation is usually achieved by locating the spring or rod in such a way that at least one vertical plane defined by one of the extremities of the leaf spring or rod falls within the vertical planes of the horizontal extremities of the frame members or vice versa.

In other words, that there be horizontal overlap between the spring or rod and the frame member. More precise centering for maximum effect will differ depending upon various design contingencies. Generally speaking, however, it is usually preferred when employing conventional C, L or I frame members and leaf springs or radius rods of conventional width to locate the spring or rod such that the "center line" (i.e., neutral axis or center of gravity) of the leaf spring or rod will fall between the vertical planes of the horizontal extremities of the frame member. In the most preferred forms, the center lines of the spring or radius rod should be vertically aligned as closely as possible with the "center line" (i.e., the neutral axis or center of gravity) of the frame member. As can be seen from FIG. 2, this desired effect, either in its preferred or less preferred forms, is achieved in the practice of this invention.

The term "in a spread configuration" as it applies to the location of the vertically flexible pneumatic chambers (air bags) is used herein in the same way as it is used in U.S. Pat. No. 3,877,718, to define a position in which the chambers aid in improving the strength of the system despite the fact that they are offset from the vertical plane of the axis, by spreading or moving the chambers outwardly. Such spreading is generally definable in terms of an inward limit for offset. That is to say, the term "in a spread configuration" means that the vertical center line (i.e., neutral axis or center of gravity) of the chambers, should not be spaced inwardly from the center line (as defined above) of the frame member more than about 20% of the width (parallel to the axis, which in the case of a conventional round chamber is its diameter) of the chamber when expanded, and preferably less than about 10%. As can be seen, from FIG. 2, this is accomplished without interference between the wheel 55 and the air bags 7 despite the fact that the unit is compact.

In summary of these terms and their use in describing the subject invention, the subject invention achieves compactness and yet retains the same strengthening positions of the various components in accordance with the teachings of U.S. Pat. No. 3,877,718.

As stated hereinabove, one of the unique features of this invention is the canting of the air bags in order to achieve compactness. By canting the air bags at a finite angle to the horizontal, space is saved and the unique features of U.S. Pat. No. 3,877,718 are now applicable to shorter or more compact units required on heavy duty trucks and trailers where space must be saved. Unfortunately, and a alluded to hereinabove, when the air bags are canted at a finite angle to the horizontal, they become subject to shear stresses, particularly when they are in expanded form, because they now do not expand and contract (or oscillate) in an aligned parallel condition. While this also happens to a lesser extent when radius rods are used with uncanted bags, it is believed that the canting of the bags serves to magnify the shear.

These stress conditions are more clearly seen by reference to the operation of the system. Upwardly biased leaf spring 33 normally holds wheels 55 out of engagement with the road surface when no air is employed in air bag 7. As air is forced into air bag 7 (by conventional means not necessary to show in this application) the air bags expand, driving axle 39 downwardly against the upward bias of leaf spring 33 until wheels 55 engage the road surface. By venting (by conventional venting means) the air from air bags 7, the upper bias of the leaf spring automatically returns the wheels to their lifted on non-roadengaging position.

It is clear that because the air bags are canted to the horizontal, when they are expanded, they are subject to a higher shear force during operation of the device than if they were uncanted. Thus, while a true "air ride" system is still achieved in this unit, in view of the fact that in the downward or road engaging position the air bags act as air springs, at least the top plate of these air springs is canted to the horizontal and thus upward forces caused by hitting bumps and the like during travel of the vehicle over the road surface cause a shearing effect in the air bags. Although conventional air bags, such as those purchaseable from Firestone Tire and Rubber Company of Akron, Ohio, are of high quality and can sustain rather high shear stresses, it is preferred for the purposes of this invention that these stresses be reduced so as to build longer life into the air bags. This is believed best achievable in the practice of this invention, keeping in mind the need for compactness and high strength, by a technique best described by reference to FIG. 3.

Figure 3:
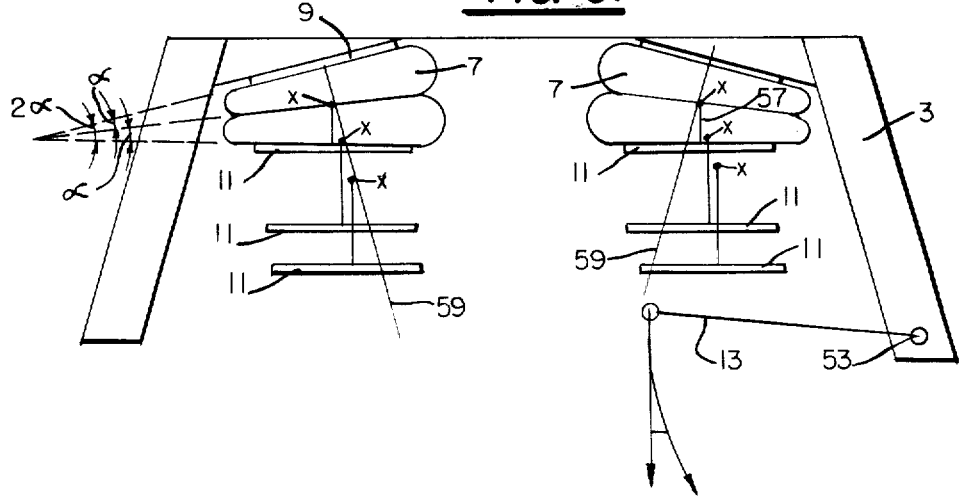
FIG. 3 is a side schematic view illustrating the various alignments in regard to this invention.

Generically, shear stresses are reduceable in the practice of this invention by manipulating angle $\epsilon$ with respect to angle $\beta$. As shown in FIG. 3 the relationship between angle $\epsilon$ and angle $\beta$ will be varied in order to achieve, as closely as possible throughout the air bag travel and particularly when in road engaging position, the condition where the perpendicular center line of the bottom plate 11 intersects the perpendicular center line of top plate 9 at a point X which bisects the angle $2\alpha$, the included angle of the plates. The air bag plates 11 in FIG. 3 are illustrated in three positions conforming to three typical positions assumed during operation. In the up position (non-road-engaging) the alignment has been shown to be ideal. But as the air bags expand to first their normal position (road engaging) and then to a maximum position (e.g., as when the wheel hits a pothole), plates 11 move not only downwardly but to the right due to the rotation of radius rod 13 about point 53. Thus the point of intersection of the perpendicular center lines of plates 9 and 11 does not meet at point X. And this is particularly pronounced in the air bags immediately above the radius rod. By adjusting the respective angles $\beta$ and $\epsilon$ in relation to each other, however, the divergence of the point of intersection from point X may be reduced and thus shear may be reduced. In other words, by more closely assimilating a "bellows" effect within the air bags shear is reduced while the other characteristics are achieved.

Perhaps, in the ideal situation, angle $\beta$ for each particular bottom plate 11 would be separately chosen so as to minimize the offset of point X as best possible. On the other hand, and in order to take into account the manufacturing and installation difficulties, it has been found not necessary to do so, but merely to meet a compromise.

In fact, it has been found for the purposes of this invention that an angle $\beta$ of approximately 0°–3° for both base plates 11 is quite sufficient to build in the necessary reduction of stress for long life of the air bags when used in combination with an angle $\epsilon$ of approximately 15°, thus giving an included angle $2\alpha$ of about 12°–15° between plates 9 and 11. When so constructed offset from point X has been found to be rather minimal (e.g., on the order of ¾ inch or less in normal position and less than 1¾ inches in maximum position, in the right-hand bags and less in the left-hand bags). When so constructed, the angles are also adequate for purposes of compacting the unit to an overall length of less than 50 inches and usually less than 47 inches, and a frame rail length of about 40 inches or less which in turn allows for an axle spacing of about 50 inches or less. At the same time the desired strengths are achieved (usually on the order of about 18,000 lbs. or more of certifiable strength per axle using conventional materials).

It is understood, of course, with regard to the above discussion and in relation to FIG. 3, that as various other units are employed, the various angles will be manipulated in order to achieve the desired results. For example, when a radius rod is not employed, different angles will usually be employed than if a radius rod were employed. In addition, if it is desirable to minimize stress, and not have quite so "compact" a unit, then it is possible to cant the angle differently for each air bag thus to achieve more reduction of stress. In practice, however, and as stated above, it is found that with the above described angle the stresses employed in high quality air bags, particularly those produced by Firestone Tire and Rubber Company, are not sufficient to in any way degrade from the long life of these air bags.

Once given the above description, many other features, modifications and improvements will become apparent to the skilled artisan. Such other modifications, features and improvements are considered, therefore, to be a part of this invention the scope of which is to be determined by the following claims:

I claim:

1. In an auxiliary axle suspension system for a wheeled vehicle having axle and wheel means which provide a primary means of vehicle support and at least one longitudinally extending frame member, the auxiliary axle suspension system comprising a relatively short frame rail for connecting the system to the vehicle frame member, at least one leaf spring, a pair of vertically flexible pneumatic chambers, downwardly extending spring hanger brackets connected at substantially the ends of the frame rail for retaining the leaf spring at its ends, means for connecting the leaf spring at a point intermediate its ends to an auxiliary axle and means locating the pneumatic chambers within the system such that one is fore and one is aft of said connecting means, said leaf spring being located substantially directly under said longitudinally extending frame member of said vehicle when the system is connected via said frame rail to the frame member of the vehicle, and said pneumatic chambers being canted at a finite angle in a longitudinally space saving configuration, whereby the overall length of said system is reduced.

2. The system of claim 1 wherein said pneumatic chambers are airbag means which are canted by tilting at least the upper surface of said airbag means, and the included angle between the upper and lower surfaces of the airbag means is such as to reduce sheer stress on the airbags during use.

3. The system of claim 2 wherein the included angle is such as to reduce the offset between the bisect of the included angle and the point of intersect between the perpendicular center line of the upper and lower surfaces of the airbags respectively.

4. The system of claim 1 wherein said pneumatic chambers are airbag means and wherein said airbags are canted by an angled flange which is connected at one leg of the angled flange to the upper surface of the airbags and to an opposing hanger bracket by another leg of said angled flange, such that said angle of said angled flange is formed at a substantial distance from the frame rail and adjacent to said opposing hanger bracket, the system further including a web means connecting said one leg of the angled flange to said frame rail, the combination thereby forming a strengthening beam of the system.

5. The system of claim 4 wherein said pneumatic chambers are located in a spread configuration, and said system further includes a radius rod means extending in the longitudinal direction of said frame rail, said rod means being located substantially directly under the longitudinally extending frame member when the system is connected via said frame rail to the frame member of the vehicle.

6. The system of claim 4 wherein said auxiliary system is a lift system, wherein said leaf spring is an upwardly biased leaf spring which normally raises the axle to a non-wheel, road engaging position and said airbags located fore and aft of said connecting means are further located in said system such that when pneumatic pressure is applied to the airbags they expand a sufficient distance to force the axle downwardly against the upward bias of said leaf spring and thus lower the axle to a wheel-road engaging position and such that upon release of said pneumatic pressure from the chambers, the upward bias of said leaf spring collapses said chambers a sufficient distance to return the axle to a non-wheel, road engaging position.

7. The system of claim 6 wherein said frame rail is less than about 40 inches in length, and the overall length of said system is less than about 50 inches.

8. A wheeled vehicle having a primary axle as a primary means of support and having mounted thereon the system of claim 7, and wherein the axle spacing between the primary and lift axle is about 50 – 51 inches or less.

9. A wheeled vehicle having a primary axle as a primary means of support and having mounted thereon the system of claim 4, wherein said frame rail is less than about 40 inches in length, the overall length of said system is less than about 50 inches, and the axle spacing between the primary and lift axle is about 50 – 51 inches or less and wherein said lift system is certifiable at about 18,000 lbs. per axle or more.

* * * * *